July 21, 1936. A. O. COBBS 2,048,105

MAP HOLDING AND DISPLAYING DEVICE FOR AUTOMOTIVE VEHICLES

Filed May 27, 1935

INVENTOR.
A. O. Cobbs
BY
M. Falbert Dick
ATTORNEY.

Patented July 21, 1936

2,048,105

UNITED STATES PATENT OFFICE 2,048,105

MAP HOLDING AND DISPLAYING DEVICE FOR AUTOMOTIVE VEHICLES

Ansalem Orville Cobbs, Des Moines, Iowa

Application May 27, 1935, Serial No. 23,612

7 Claims. (Cl. 40—10)

The principal object of my invention is to provide a device for holding road maps or like in a readable condition and which can be easily attached to or detached from an ordinary adjustable automotive vehicle sun visor.

A further object of this invention is to provide a road map holding and displaying device that permits the ready removal or replacement of the map.

A still further object of my invention is to provide a road map holder that will fit vehicle sun visors of various sizes, shapes, and designs.

A still further object of my invention is to provide a map holding device for automotive vehicles that is refined in appearance, economical in manufacture, and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Road maps are universally used by everyone motoring any distance over our highways. It is, however, almost impossible for the operator of an automotive vehicle to check his bearings on the map while driving, although periodic orientation with the use of the map is frequently necessary to keep from getting onto the wrong road. The result is that the operator is required to make frequent stops to study his map, which is a loss of time, inconvenient, and annoying. I have overcome such objections as will hereinafter be appreciated.

Figure 1:
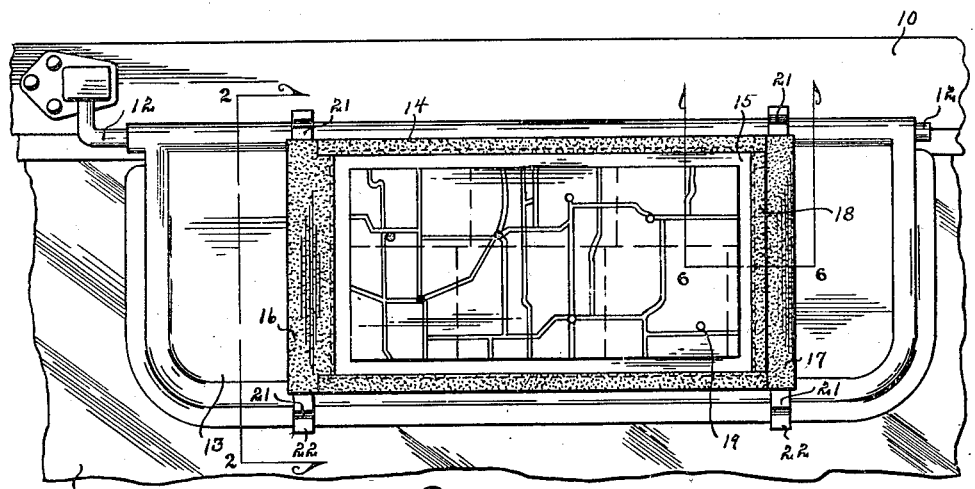
Fig. 1 is a front view of my device installed and ready for use.

Referring to the drawing, I have used the numeral 10 to designate the inside frame of the seating compartment of a vehicle carrying the windshield 11. Most vehicles of this character have an adjustable sun visor secured to the vehicle frame just above the windshield as shown in Fig. 1. I have used the numeral 12 to designate the usual rod arm of the sun visor secured by suitable means to the vehicle frame and having the usual non-transparent rigid flap or visor 13 rotatably secured at its upper marginal edge around the rod arm.

Figure 2:
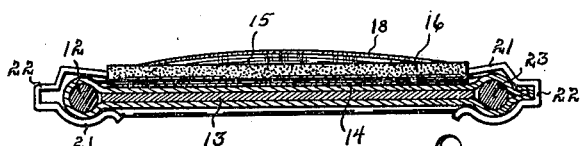
Fig. 2 is an end view of the envelope portion and a cross-sectional view of the supporting device taken on line 2—2 of Fig. 1.

Due to this method of mounting of the visor element 13 on the arm 12, the upper or secured marginal edge of the element 13 will be substantially rounded, while the lower or free marginal edge of the visor element 13 will be comparatively thin as shown in Fig. 2. These visors may be manually rotated to a vertical position as shown in Fig. 1, or rotated to an out-of-the-way horizontal position adjacent the top of the seating compartment. If a vehicle has such a sun visor my map holding compartment may be easily and quickly attached thereto, but if a car is not so equipped, then and in that event, such an apparatus as that just described for the sun visor must be sold with the map holding compartment portion and to all intents and purposes considered as a definite part of my map holding and displaying device.

Referring to the map holding compartment portion, I have used the numeral 14 to generally designate the backing sheet to form the back of the envelope portion. This backing sheet 14 is folded back upon itself at its upper and lower marginal edges to engage and overlap the upper and lower marginal edges of the transparent front sheet 15, respectively. These marginal edge portions of the backing sheet and transparent front sheet are secured together by any suitable means such as by sewing. The backing sheet may be made of any suitable flexible material such as imitation leather and the transparent front sheet of any suitable transparent or translucent material such as celluloid. Each end of the backing sheet 14 is also bent back upon itself and stitched to form two open end sleeves 16 and 17 at the two ends of the envelope, respectively, as shown in the drawing. The left end flap of the backing sheet that is folded over to create the sleeve 16 may also overlap the left end of the transparent sheet 15, to close the left end of the envelope.

Figure 5:
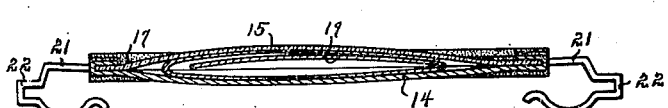
Fig. 5 is a transverse cross-sectional view of the device before installation.
Figure 6:
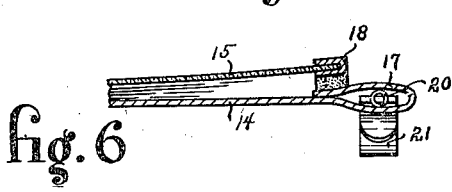
Fig. 6 is a sectional view of one corner of the open end of the device and is taken on line 6—6 of Fig. 1.

The right end marginal edge of the transparent sheet may have a binding 18 around its edge to strengthen it and add to the appearance of the device. The map 19 to be held and displayed is placed between the backing sheet 14 and transparent front sheet 15, as shown in Fig. 1, by being manually inserted into the open end of the envelope between the right marginal edge of the transparent front sheet and right end portion of the backing sheet. These maps are given away free at all gasoline service stations and are folded as shown in Fig. 5, with their desired front portion adjacent the envelope window which is closed by the transparent sheet 15.

Figure 3:
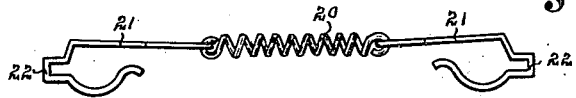
Fig. 3 is an end view of one of the map compartment end attaching means.
Figure 4:
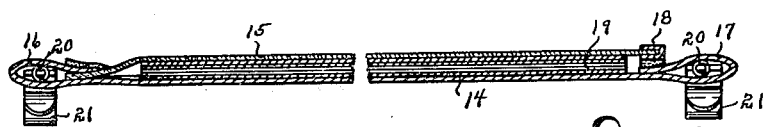
Fig. 4 is a longitudinal cross-sectional view of my device before installation.

The numeral 20 designates a coil spring loosely resting in each of the sleeves 16 and 17. Secured to each end of each of the springs 20 is a hook element 21 of spring sheet steel or like, with its hook portion extending out of the sleeve in which it operates. The flat portion of each of these four hook elements that extend into the sleeves are bent somewhat inwardly relative to their longitudinal axes as shown in Fig. 3, in order that these flat portions will yieldingly press toward the surface of the visor 13 to hold the envelope portion close and tightly onto the visor when the device is mounted on a sun visor or like supporting device. To attach the envelope portion on a visor or like, it is merely necessary to place the hook elements around the upper and lower marginal edges of the same, with the map visible and to the front as shown in Fig. 1. The map holder may be as easily removed merely by detaching the hook elements from the visor and against the action of the springs 20. These springs 20 yieldingly hold the hook elements in engagement with the marginal edges of the sun visor and the envelope portion flatly onto the side of the visor.

The bottoms of each of the hook elements have a comparatively thin rectangularly formed portion 22 for successfully receiving the comparatively thin lower marginal edge of the visor as shown in Fig. 2. These hook elements are all duplicates and in case the lower marginal edge of the visor is rounded and not thin, or in the case of the rounded upper marginal edge of the visor, these portions 22 are of no moment. The numeral 23 designates a strengthening bar in the visor which extends near its bottom and sides.

With the desired map in place in the envelope portion it is a simple matter for the operator of the vehicle while driving to lower the visor and easily read the held map before him. When not needed the visor may be manually rotated to an out-of-the-way horizontal position near the top of the seating compartment of the vehicle.

As the springs 20 and hook elements are loosely mounted in the open sleeves 16 and 17, they are slidable relative to the envelope portion, and therefore the envelope portion may be slid upwardly or downwardly limited distances for adjusting it onto the face of the visor. This yieldingly holding of the envelope portion on the visor permits yielding tolerances to facilitate the placement of maps into the same. Although I have described my device as particularly adapted to the holding and displaying of maps, obviously it may be used for other purposes such as a holder for mirrors, certificates, drivers' licenses, etc.

Some changes may be made in the construction and arrangement of my improved map holding and displaying device for automotive vehicles without departing from the real spirit and purpose of my invention, and it is my intention to cover by my claims any modified forms of structure or use of mechanical equivalents which may be reasonably included within their scope.

I claim:

1. In a device of the class described, an envelope member consisting of a back sheet member and a front sheet member of transparent material, a sleeve element secured to each end of said envelope member, a coil spring slidably mounted in one of said sleeve elements, a hook member secured to each end of said coil spring and extending out of both ends of said sleeve element respectively, a second coil spring slidably mounted in said other sleeve element, and a hook member secured to each end of said second coil spring and extending out of both ends of said last-mentioned sleeve element respectively.

2. In a device of the class described, an envelope member having a window, a transparent sheet member closing said window, a sleeve formed on each end of said envelope having its two ends open, a hook member extending into each of the open ends of one of said sleeves, a yieldable means connecting said two hook members and positioned wholly inside said sleeve, a hook member extending into each end of said other sleeve, and a yielding means connecting said last-mentioned two hook members and positioned wholly within said last-mentioned sleeve.

3. In a device of the class described, an envelope member having a window, a sleeve secured to each end of said envelope having its two ends open, two hook members having their shank portions loosely extending into the two ends of one of said sleeves, a coil spring having one end secured to the shank of one of said hook members and its other end secured to the shank of said other hook member and positioned loosely inside the sleeve in which the hook members extend, two hook members having their shank portions loosely extending into the two ends of the other said sleeve, and a coil spring having one end secured to the shank of one of said last-mentioned hook members and its other end secured to the shank of the other said last-mentioned hook member and positioned loosely inside said last-mentioned sleeve.

4. In a map holding and displaying device designed to be detachably secured to an automotive vehicle sun visor, an envelope member having a window, a transparent sheet member closing said window, two hook members operatively secured to one end of said envelope member designed to engage the upper and lower marginal edges of a sun visor, a means for yieldingly holding said hook members toward each other, two hook members operatively secured to the other end of said envelope member designed to engage the upper and lower marginal edges of a sun visor, and a means for yieldingly holding said last-mentioned two hook members toward each other.

5. In a map holding and displaying device designed to be detachably secured to an automotive vehicle sun visor, an envelope member having a window, a transparent sheet member closing said window, two hook members operatively secured to one end of said envelope member designed to engage the upper and lower marginal edges of a sun visor, a means for yieldingly holding said hook members toward each other, two hook members operatively secured to the other end of said envelope member designed to engage the upper and lower marginal edges of a sun visor, and a means for yieldingly holding said last-mentioned two hook members toward each other; all of said hook members having their shanks bent at an angle relative to their longitudinal axes.

6. In a map holding and displaying device designed to be detachably secured to an automotive vehicle sun visor, an envelope member having a window, a transparent sheet member closing said window, two hook members operatively secured to one end of said envelope member designed to engage the upper and lower marginal edges of a sun visor, a means for yieldingly holding said hook members toward each other, two hook members operatively secured to the other end of said envelope member designed to engage the upper and lower marginal edges of a sun visor, a means for yieldingly holding said last-mentioned two hook members toward each other, and a rectangular bend in the bottoms of two of said hook members.

7. In a device of the class described, a backing sheet having both of its end portions folded back upon itself to form sleeve elements and its upper and lower marginal side edge portions folded back upon itself, a transparent sheet member on said backing sheet having its marginal edge portions under said folded side portions of said backing sheet, sewing for securing said folded side portions to said backing sheet and to said transparent sheet member, sewing for securing said folded end portions to said backing sheet, elements slidably extending into each end of each of the sleeves formed by the folding and sewing of the end portions of said backing sheet, and a yielding means for yieldingly limiting the withdrawal of said elements from said sleeves.

ANSALEM ORVILLE COBBS.